Patented Dec. 20, 1927.

1,653,302

UNITED STATES PATENT OFFICE.

HOWARD W. MATHESON, OF MONTREAL, QUEBEC, CANADA, ASSIGNOR TO CANADIAN ELECTRO PRODUCTS CO. LIMITED, A CORPORATION OF CANADA.

PROCESS OF MAKING CONDENSATION PRODUCTS.

No Drawing. Application filed August 19, 1922. Serial No. 583,038.

This invention relates broadly to improved so-called synthetic resins and to the manufacture of same. More particularly the invention relates to the products resulting from the reaction of phenolic bodies and aldehydes and to the method of making same. The object of the invention is to provide products which have desirable characteristics for the uses to which phenolic resins are adapted, and further to provide a process by which such products may be manufactured easily and more cheaply than resins heretofore produced.

It is well known in the art that phenol and its homologues will react with formaldehyde or its polymers to produce fusible resinous bodies which, under suitable conditions of heat and pressure and by the addition of hardening agents, may be rendered infusible and insoluble.

According to the present invention a resin having many desirable qualities and being superior in many points to resins at present known is produced by the reaction between phenol or its homologues and acetaldehyde or its polymers or derivatives. The reaction is carried out by means of condensing catalytic agents and preferably in anhydrous media at pressures above atmospheric, although these last two conditions are not essential to successful operation.

The condensing or catalytic agents preferably utilized are of acidic nature, such as hydrochloric acid, hydrogen chloride, sulphuric acid, phosphoric acid or halogen derivatives of non-metals or of non-metallic acid-forming radicals.

The last defined group of agents includes, for the purpose of this invention, the halogen-oxy-derivatives of non-metals, such as sulphur, phosphorus, carbon, selenium, hydrogen and others; and chlorine derivatives of elements such as phosphorus, sulphur and selenium, for example, sulphuryl-chloride, sulphur mono-chloride, phosphorus tri-chloride, phosphorus-oxy-chloride, phosphorus penta-chloride; and the halogen derivatives of organic acid radicals, such as acetyl-chloride, benzyl-chloride and anhydrous hydrogen-chloride.

In carrying out the invention, materials are mixed together in a large vessel or autoclave and preferably, but not necessarily, an initial pressure of twenty or twenty-five (20 or 25) pounds is applied, preferably by means of a gas inert in the reaction, such as nitrogen.

The reaction starts spontaneously accompanied by generation of heat until the major portion of the reaction is complete. In order to complete the reaction, or at least in reasonable time, external heating must be resorted to.

When the materials are brought together in the reaction vessel, the same must be closed quickly since, as already mentioned, the reaction starts spontaneously. Within a few minutes the temperature rises rapidly to 50° to 80° C. and the autoclave being closed the pressure increases to from 50 to 85 pounds per square inch.

Usually in from five to thirty minutes the reaction has progressed as far as it will go without external heating, and thereafter heat is applied during a period from one to several hours, depending upon the mass of material and the amount of catalytic agent present. The temperature during this period is preferably maintained at approximately 60° to 80° C., although a wider range of temperature may be utilized and is practicable.

On completion of the reaction, the product, which is liquid at the temperature of reaction, may be poured from the vessel and on cooling solidifies to a reddish coloured, brittle mass which still contains a small amount of uncombined phenol.

The following examples in which quantities are by weight, will serve to illustrate the invention;—

*Example I.*—300 parts of phenol, 126 parts paraldehyde and approximately 3 parts of sulphuryl chloride ($SO_2Cl_2$) are placed in an autoclave and the same quickly closed and pressure of 25 lbs. per square inch applied. Within 30 minutes the temperature rises quickly to 50° to 80° C. and the pressure to 50 to 85 pounds per square inch, due to the vigorous reaction. After the initial reaction has ceased, the autoclave may be heated for a period of from one to two hours at about 80° C. The finished soluble product may be used in this form in the production of lacquers, etc., or it may be rendered infusible, for instance, by the method previously outlined, with or without the addition of pigments and fillers.

*Example II.*—300 parts phenol, 126 parts paraldehyde and approximately 3 parts of sulphur chloride ($S_2Cl_2$) are placed in an autoclave and same quickly closed and pressure of 25 pounds per square inch applied. Within thirty minutes, as before, a vigorous action takes place, causing the temperature to spontaneously rise to about 50° to 80° C. and the pressure to from 50 to 85 pounds per square inch. The reaction may then be completed as in Example I.

*Example III.*—300 parts phenol, 126 parts paraldehyde and approximately 3 parts phosphorus oxy-chloride are placed in an autoclave and same quickly closed and pressure of 25 pounds per square inch applied. The materials react quickly and the temperature rises spontaneously to from 50° to 80° C. and the pressure to as high as 85 pounds per square inch. After the initial reaction is completed, contents are heated as previously described and with similar results.

*Example IV.*—The process is carried out as described in previous examples, utilizing thionyl chloride as condensing reagent.

*Example V.*—The process is carried out as described in previous examples, utilizing acetyl chloride as condensing agent.

*Example VI.*—The process is carried out as in Example I, except that 4 to 10 parts of 37% concentrated hydrochloric acid is utilized as the catalyst. Similar results are obtained.

In order to render the material thus manufactured of practical use, the procedure adopted is that which is fairly well known in the art of the utilization of synthetic resins.

In cases where the volatile acid such as hydrochloric is used for condensation, this may be removed from the reaction mass in the autoclave by any desirable method such as the use of superheated steam.

Where the acids are non-volatile, these may be removed by washing or neutralization, or by a combination of both or, the amount of acidic body being small, it may be left in the resinous material since it is not detrimental to the major number of uses to which the material is put.

The resin thus obtained is fusible and soluble and for commercial application may be utilized in the following manner.

For the manufacture of varnish, this material may be dissolved in any suitable solvent such as alcohol to which is added a suitable amount of hardening agent such as hexamethylenetetramine. The varnish thus prepared may be utilized in any manner and for any use to which such materials are adapted, but more especially they are adapted for electrical insulation work, the film formed after the evaporation of the solvent being preferably hardened by baking either with or without the application of pressure.

For the manufacture of moulding powder, the material is preferably admixed with fillers, the most suitable of which is wood flour, to which is also added a hardening agent such as hexamethylenetetramine.

The commercial methods adopted for the impregnation of wood flour may be outlined as follows:—

100 parts of fusible resin are dissolved in an equal quantity of a suitably denatured alcohol. This solution may be effected in any desirable manner, such as by the use of a ball mill, a suitable quantity of hardening agent being added at the same time. An amount which is found to be suitable when using hexamethylenetetramine is from three to ten parts. The mixture is then transferred to a mixer and from seventy to one hundred parts of wood flour is added and the mixing continued until thorough incorporation is effected. The amount of wood flour varies, depending upon the purposes to which the moulding powder is to be utilized. The solvent is now evaporated in any desirable manner such as the use of a vacuum shelf dryer, the temperature being preferably maintained under 60° C. The resulting material after grinding to suitable fineness, is ready for moulding into any desirable form of object by the application of heat and pressure in suitable moulds. Blanks formed before evaporation of the solvent may, after evaporation of solvent, be pressed to shape and hardened, thus omitting the grinding step.

Colouring matter such as nigosine black, etc., may be added to the resin during the period of solution in the ball mill. At times it will also be found desirable to add a small percentage of stearic acid which seems to have the effect of minimizing the adherence of the formed articles to the material of the mould itself.

A second method which is found desirable for the incorporation of fillers, particularly wood flour with resin, is by the utilization of heated mixing rolls. The rolls are heated to a temperature at which the resin becomes softened, viz: 40° to 60° C. and wood flour is incorporated in the usual way. Colouring material, hardening agents and any other desirable bodies may be added during this incorporation. At the completion of the incorporation, the material is ready for moulding into any desired form.

While in the foregoing disclosure only phenol is mentioned, it is found that cresol may be also utilized, but the results obtained are not as satisfactory as when utilizing phenol. It is found however, to be practical to use a commercial admixture of phenol and cresols, a desirable mixture being 90% phenol and 10% cresols, but these proportions may be varied within limits. The use of other phenolic bodies may also be practicable and such use is contemplated.

While hexamethylenetetramine is the only agent so far specifically mentioned, it must be understood that the invention is not limited to this material but contemplates the use of any suitable hardening agent. One or more of the following may be found suitable:—a phenylenediamine, aldehyde ammonia, furfuramid, ethylidene aniline or other acetaldehyde-aniline compound.

While acetaldehyde is the only aldehyde mentioned it will be understood that the invention also contemplates, where practicable, the use of polymers or derivatives of acetaldehyde or bodies which will yield acetaldehyde in the reaction.

Therefore, it must be understood that the invention is not confined to any or all of the specifically named materials, nor to the precise proportions or details of pressure and temperature herein set forth by way of illustration, as modifications and variations may be made as conditions may require or the same may be deemed desirable.

While the product formed according to this invention has been heretofore described only in connection with the manufacture of varnish and moulding powder, it will be understood that its use is not thus limited. The material may be used for the manufacture of insulating products, impregnating fibre in any form, such as wood or wood fibre, paper, fabrics or also mineral and animal fibre. The fillers and colouring agents which may be used are not restricted to those heretofore mentioned but may include earthy or mineral matter and pigments as well as dyes. Also the resin may be used without admixture with other materials. The articles which may be made using the resin are too numerous to be all mentioned, but as an indication of the scope of uses, the following are mentioned:— blocks, rods, tubes and sheets of the pure resin or impregnated fibre or paper for insulation and other purposes; impregnated fabric for gear manufacture and the like, and many moulded articles such as cigar and cigarette holders, pipe stems, hair combs, beads, buttons, handles for various uses, battery jars and parts of electrical apparatus; fiberware such as pails, tubs, containers, flooring tiles and stair treads. Using asbestos there may be manufactured brake linings and the like, or using the resin as a binder there may be manufactured abrasive articles such as polishing and grinding wheels.

Having thus described my invention, what I claim is:—

1. In a process of making an acetaldehyde-phenol condensation product, the steps comprising the condensation of phenol and acetaldehyde with less than 1% of a condensing agent comprising a halogen derivative of a non-metal, under pressure and at a temperature of about 50° to 80° C.

2. The invention in claim 1, wherein the heating lasts for one to two hours.

3. The invention in claim 1, wherein the reaction is carried out in anhydrous media and under anhydrous conditions.

4. The invention in claim 1, wherein the proportions of phenol and acetaldehyde are in the approximate ratio of 300 to 126.

5. A fusible, soluble, condensation product of acetaldehyde and phenol, having a reddish color and of brittle nature, liquid at 50° to 80° C. and capable of hardening under the action of a compound having mobile methylene groups.

6. A fusible, soluble, condensation product of acetaldehyde and phenol, having a reddish color and of brittle nature, liquid at 50° to 80° C. and capable of hardening under the action of hexamethylenetetramine.

7. The invention in claim 2, wherein the reaction is carried out in anhydrous media and under anhydrous conditions.

8. The invention in claim 2, wherein the proportions of phenol and acetaldehyde are in the approximate ratio of 300 to 126.

9. The invention in claim 3, wherein the proportions of phenol and acetaldehyde are in the approximate ratio of 300 to 126.

In witness whereof, I have hereunto set my hand.

HOWARD W. MATHESON.